US010346851B1

(12) United States Patent
Kapoor et al.

(10) Patent No.: US 10,346,851 B1
(45) Date of Patent: Jul. 9, 2019

(54) AUTOMATED INCIDENT, PROBLEM, CHANGE CORRELATION ANALYSIS SYSTEM (71) Applicant: Numerify, Inc., Cupertino, CA (US)

(72) Inventors: Rahul Kapoor, Sunnyvale, CA (US); Gaurav Rewari, Cupertino, CA (US)

(73) Assignee: Numerify, Inc., San Jose, CA (US)

( * ) Notice: Subject to any disclaimer, the term of this patent is extended or adjusted under 35 U.S.C. 154(b) by 493 days.

(21) Appl. No.: 15/202,113

(22) Filed: Jul. 5, 2016

(51) Int. Cl.
G06F 17/30 (2006.01)
G06Q 30/00 (2012.01)
G06F 16/35 (2019.01)
G06F 16/33 (2019.01)
G06F 16/901 (2019.01)

(52) U.S. Cl.
CPC ....... G06Q 30/016 (2013.01); G06F 16/3344 (2019.01); G06F 16/355 (2019.01); G06F 16/9024 (2019.01)

(58) Field of Classification Search
CPC .................................................. G06F 11/079
See application file for complete search history.

(56) References Cited

U.S. PATENT DOCUMENTS

| 6,650,949 B1 * | 11/2003 | Fera | G05B 23/0262 700/79 |
| 2005/0108384 A1 * | 5/2005 | Lambert | H04L 63/1408 709/224 |
| 2009/0132208 A1 * | 5/2009 | Ukyo | G06F 17/5009 703/1 |
| 2009/0186610 A1 * | 7/2009 | Avni | H04W 24/08 455/425 |
| 2015/0310086 A1 * | 10/2015 | Tee | G06F 17/30598 707/737 |

* cited by examiner

Primary Examiner — Mark D Featherstone
Assistant Examiner — Navneet Gmahl
(74) Attorney, Agent, or Firm — Rahman LLC (57) ABSTRACT Approaches for automatically determining of correlation for incident, problem and change items. Approaches may perform the steps of: (i) automatically extracting relevant information that includes any of (a) a time of occurrence, (b) important keywords, (c) a category, or sub-category classification, (d) related configuration items, (e) a group membership of the user who worked on, and (f) outage records associated with the incident, problem, and change items; and (ii) automatically analyzing persisted correlation maps using the essence key phrases associated with the incidents to identify essence key phrases of contributing problems, and changes; and (iii) automatically clustering the incidents, optionally with (A) the problems, and (B) the changes to identify clusters of related incident, problem and change items based on the relevant information associated with the incident, problem, and change items.

20 Claims, 9 Drawing Sheets

AUTOMATED INCIDENT, PROBLEM, CHANGE CORRELATION ANALYSIS SYSTEM

TECHNICAL FIELD

Embodiments of the invention generally relate to correlation analysis, and more specifically to approaches for automatic determination of correlation for incident, problem and change items.

BACKGROUND

Information Technology Infrastructure Library (ITIL) and International Organization for Standardization (ISO) 20000 formalize a set of practices for IT Service Management (ITSM). ITSM includes several processes like incident management focused on restoring normal service operation as quickly as possible, problem management focused on finding the root cause of problems and thus preventing further incidents, change management focused on ensuring that standardized methods and procedures are used for efficient and prompt handling of all changes, and configuration management that tracks entities (i.e. configuration items like a computer, a laptop, a router, a server, an IT service, etc.) along with their properties and relationships in a configuration management database.

The above mentioned ITSM process areas track incident, problem, and changes where the incident is defined as an unplanned interruption to a service, a reduction in the quality of a service, or an event that has not yet impacted the service to a customer, problem is the root cause of related incidents, and change is a way to resolve a problem. Changes are typically done to resolve incidents and problems, but sometimes may be the cause of new incidents as well. ITSM systems also link incidents, problems, and changes to configuration items (CIs) to which they relate. Some ITSM systems may also explicitly cull out outages (i.e. the unavailability of a service) and link them to the service CI, and related incidents or problems, allowing for outage duration, severity and business impact to be tracked more easily.

Recording outages explicitly and linking them to related incidents and problems can help track root cause of Service Level Agreements (SLA) breaches. Correlating incidents to underlying problems, or to changes that may have led to the incidents, helps with categorizing incidents and understanding their root cause. For example, occurrence of multiple 'incidents' related to a common asset (i.e. CI) may suggest a 'problem' with that particular asset that requires a rectifying 'change' which could be an update or replacement of the asset. Repeated large number of such 'incidents' and 'problems' with an asset class may point to an underlying asset defect suggesting a bigger 'change' may be in order, like switching to a better performing equivalent asset from a competitor.

In existing ITSM systems, correlations are typically done manually and retrospectively. As a result, it is sometime cumbersome to resolve incidents sooner and to identify problematic incidents needing urgent attention. For example, incoming incidents that are related to an incident which has breached its SLA are likely to breach their SLA as well if the underlying common Problem has not been resolved, so identifying related incidents and problems as new Incidents is essential to identify problematic incidents that could breach a SLA.

SUMMARY

In view of the foregoing, an embodiment herein provides one or more non-transitory computer readable storage mediums storing one or more sequences of instructions, which when executed by one or more processors, performs a method of automatically determining correlation for one or more of incident, problem and change items. The method includes the steps of: (i) storing one or more persisted correlation maps, wherein the one or more persisted correlation maps include a historical map that correlates at least one of (a) essence key phrases of one or more incidents to essence key phrases of one or more problems, and (b) the essence key phrases of the one or more incidents to essence key phrases of one or more changes that cause the one or more incidents; (ii) automatically extracting at least one of (a) occurrence timestamps, (b) text fields that include at least one of (A) a title, (B) a description, (c) a category, or sub-category classification, (d) one or more related configuration items, (e) a group membership of a user who worked on, and (f) one or more outage records associated with the one or more incident, problem, and change items; (iii) automatically extracting at least one of (a) one or more important keywords, and (b) one or more essence key phrases from the text fields associated with the one or more incident, problem and change items; (iv) automatically identifying a time of occurrence of the one or more incident, problem and change items based on at least one of (a) the timestamps, and (b) mention of time occurrence in the text fields associated with the one or more incident, problem and change items; (v) automatically analyzing the one or more persisted correlation maps using the one or more essence key phrases associated with the one or more incidents to identify essence key phrases of contributing problems, and changes; and (vi) automatically clustering the one or more incidents, optionally with (a) the one or more problems, and (b) the one or more changes to identify clusters of related incident, problem and change items based on at least one of (A) the time of occurrence, (B) the one or more important keywords, (C) the category, or sub-category classification, (D) the one or more related configuration items, (E) the group membership of the user who worked on, and (F) the one or more outage records associated with the one or more incident, problem, and change items. The one or more important keywords include one or more related keywords that are identified using semantic analysis.

In one embodiment, the method includes the step of automatic highlighting of additions or removals of incidents, problems and changes when the one or more incident, problem and change items form a partially connected graph that needs to be completed.

In another embodiment, the method includes the step of automatic highlighting of the removal of incidents, problems and changes and existence of sub-clusters as potential differences when the one or more incident, problem and change items from a connected graph that needs to be validated.

In yet another embodiment, the method includes the step of automatically obtaining first user input to create a final incident cluster.

In yet another embodiment, the method includes the step of automatically determining matching problems and changes by (a) analyzing the one or more persisted correlation maps using the one or more essence key phrases of the one or more incidents, and (b) extending the final incident cluster to include problems and changes. The problems and changes that match multiple incidents in the final incident cluster are automatically ranked higher.

In yet another embodiment, the method includes the steps of (i) automatically obtaining a second user input to determine final incident, problem, and change clusters, and (ii) automatically updating the one or more persisted correlation maps with at least one of (a) a new/deleted incident-problem correlation, or (b) a new/deleted incident-change correlation based on the final incident, problem, and change clusters.

In yet another embodiment, the method includes the step of automatically determining possible problems by analyzing one or more essence problem key phrases for each of the one or more incidents from the one or more persisted correlation maps if no matching problem record exists for the final incident cluster. The one or more essence problem key phrases retrieved for multiple incidents may rank higher.

In one aspect, an embodiment herein provides one or more non-transitory computer readable storage mediums storing one or more sequences of instructions, which when executed by one or more processors, performs a method for automatically determining correlation for an input incident. The method includes the steps of: (i) storing one or more persisted correlation maps; (ii) automatically extracting at least one of (a) timestamps, (b) text fields that include at least one of (A) a title, and (B) a description, (c) a category, or sub-category classification, (d) one or more related configuration items, (e) a group membership of a user who worked on, and (f) one or more outage records associated with the input incident; (iii) automatically extracting at least one of (a) one or more important keywords, and (b) one or more essence key phrases from the text fields associated with the input incident; (iv) automatically identifying a time of occurrence of the input incident based on at least one of (a) the timestamps, and (b) mention of time occurrence in the text fields associated with the input incident; (v) automatically determining whether the input incident is related with at least one of (A) an existing incident cluster, and (B) an existing standalone incident by computing distances between the input incident and the existing incident cluster, or the existing standalone incident based on at least one of (a) the time of occurrence (b) the one or more important keywords, (c) the category, or sub-category classification, (d) the one or more related configuration items, (e) the group membership of a user who worked on, and (f) the one or more outage records associated with the input incident; (vi) automatically clustering the input incident with (a) the existing standalone incident to form a new incident cluster if the input incident is related to the existing standalone incident, or (b) the existing incident cluster if the input incident is related to the existing incident cluster; (vii) automatically analyzing the one or more persisted correlation maps using the one or more essence key phrases associated with the input incident to identify essence key phrases of matching problems, and changes; and (viii) automatically (a) determining existing matching problems and changes using the one or more essence key phrases associated with the input incident if the input incident is a part of a new incident cluster, or a standalone incident, and (b) adding new problem and change to the existing incident cluster if the input incident is a part of the existing incident cluster.

In one embodiment, the method includes the steps of (i) automatically obtaining user input for clustering the input incident to obtain a final incident, problem, and change cluster, and (ii) automatically updating the one or more persisted correlation maps with at least one of (a) a new incident-problem correlation, or (b) a new incident-change correlation.

In another embodiment, the method includes the step of automatically determining possible problems if no matching problem record exists for the new created incident cluster by analyzing essence key phrases retrieved from the persisted correlation maps for each incident of the new created incident cluster. The essence problem key phrases retrieved for multiple incidents may rank higher.

In another aspect, an embodiment herein provides one or more non-transitory computer readable storage mediums storing one or more sequences of instructions, which when executed by one or more processors, performs a method for automatically determining correlation for an input problem. The method includes the steps of: (i) storing one or more persisted correlation maps; (ii) automatically extracting at least one of (a) timestamps, (b) text fields that includes at least one of (A) a title, and (B) a description, (c) a category, or sub-category classification, (d) one or more related configuration items, (e) a group membership of a user who worked on, and (f) one or more outage records associated with the input problem; (iii) automatically extracting at least one of (a) one or more important keywords, and (b) one or more essence key phrases associated with the input problem; (iv) automatically identifying a time of occurrence of the input problem based on at least one of (a) the timestamps, and (b) mention of time occurrence in the text fields associated with the input problem; (v) automatically determining potentially related incidents, and incident clusters based on a window identified by at least one of (a) padding the time of occurrence of the input problem, and (b) considering incident, problem and changes with same configuration items as the input problem; (vi) automatically re-clustering of the existing incident cluster, or the standalone incident without associated problems based on at least one of (a) the one or more important keywords, (b) the category, or the sub-category classification, (c) the one or more related configuration items, or (d) the one or more outage records, (e) the time of occurrence to determine whether (A) the input problem is related to the existing incident cluster, or the existing standalone incidents, or (B) the input problem creates a new incident cluster, or associates with a standalone incident; (vii) automatically analyzing the one or more persisted correlation maps using the one or more essence key phrases associated with the input problem to identify whether the input problem is related with (a) the existing incident cluster, or (b) the existing standalone incident; (viii) obtaining a user input for clustering the input problem to obtain a final incident, problem change cluster; and (ix) automatically updating the persisted correlation maps with at least one of (a) a new incident-problem correlation, or (b) a new incident-change correlation.

In yet another aspect, an automated incident, problem, change correlation analysis system that determines correlation for input incident, problem and change items is provided. The system includes a memory, a display, and a processor. The memory stores a database and a set of modules. The database stores one or more persisted correlation maps. The one or more persisted correlation maps include a historical map that correlates at least one of (a) essence key phrases of one or more incidents to essence key phrases of one or more problems, and (b) the essence key phrases of the one or more incidents to essence key phrases of the one or more changes that cause the one or more incidents. The processor executes the set of modules. The set of modules include an incident, problem, change information extraction module, a text analysis module, a time window analysis module, a correlation map analysis module, and an incident, problem, and change clusters determination module. The incident, problem, change information extraction module, implemented by the processor, automatically extracts at least one of (a) timestamps, (b) text fields that include at least one of (i) a title, and (ii) a description, (c) a category, or sub-category classification, (d) one or more related configuration items, (e) a group membership of a user who worked on, and (f) one or more outage records associated with the input incident, problem, and change item. The text analysis module, implemented by the processor, automatically extracts at least one of (a) one or more important keywords, and (b) one or more essence key phrases associated with the input incident, problem and change items. The one or more important keywords include one or more related keywords that are identified using semantic analysis. The time window analysis module, implemented by the processor, automatically identifies a time of occurrence of the input incident, problem, and change item based on the timestamps associated with the input incident, problem, and change item. The correlation map analysis module, implemented by the processor, automatically analyzes the one or more persisted correlation maps using the one or more essence key phrases associated with the input incident, problem, and change item to identify essence key phrases of contributing problems, and changes. The incident, problem, change clusters determination module, implemented by the processor, automatically clusters the incidents, optionally with (a) problems, and (b) changes to identify clusters of related incident, problem and change items based on at least one of (i) the time of occurrence, (ii) the one or more important keywords, (iii) the category, or sub-category classification, (iv) the one or more related configuration items, (v) the group membership of the user who worked on, and (vi) the one or more outage records associated with the input incident, problem, and change items.

In one embodiment, the automated incident, problem, change correlation analysis system further includes a final incident, problem, and change clusters determination module, implemented by the processor that automatically obtains a user input to determine a final incident cluster.

In another embodiment, the incident, problem, change clusters determination module automatically determines matching problems and changes by (a) analyzing the one or more persisted correlation maps using the one or more essence key phrases of the incident, and (b) extending the final incident cluster to include problems and changes. The incident, problem, change clusters determination module automatically ranks higher the problems and changes that match multiple incidents in the final incident cluster.

In yet another embodiment, the incident, problem, change clusters determination module performs (a) automatic highlighting of additions or removals of incidents, problems and changes when the one or more incident, problem and change items form a partially connected graph that needs to be completed, and (b) automatic highlighting of removal of the incidents, problems and changes and existence of sub-clusters as potential differences when the one or more incident, problem and change items from a connected graph that needs to be validated.

In yet another embodiment, the final incident, problem, change clusters determination module automatically obtains a second input to determine final incident, problem, and change clusters.

In yet another embodiment, the automated incident, problem, change correlation analysis system further includes a correlation map augmentation module, implemented by the processor, that automatically updates the one or more persisted correlation maps with at least one of (a) a new/deleted incident-problem correlation, or (b) a new/deleted incident-change correlation.

In yet another embodiment, the incident, problem, change clusters determination module automatically determines possible problems by analyzing one or more essence problem key phrases for the incident from the one or more persisted correlation maps if no matching problem record exists for the final incident cluster. The essence problem key phrases retrieved for multiple incidents may rank higher.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments presented herein and the various features and details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended to facilitate an understanding of ways in which the embodiments herein may be practiced and to further enable those of skill in the art to practice the embodiments herein. Accordingly, the examples should not be construed as limiting the scope of the embodiments presented herein.

Various embodiments disclosed herein provide an automated incident, problem, change correlation analysis system that determines correlation for an input incident, problem and change item. The automated incident, problem, change correlation analysis system automatically determines correlation for one or more incident, problem and change items by analyzing one or more persisted correlation maps. Referring now to the drawings, and more particularly to FIGS. 1 through 7, where similar reference characters denote corresponding features consistently throughout the figures, preferred embodiments are shown.

Figure 1:
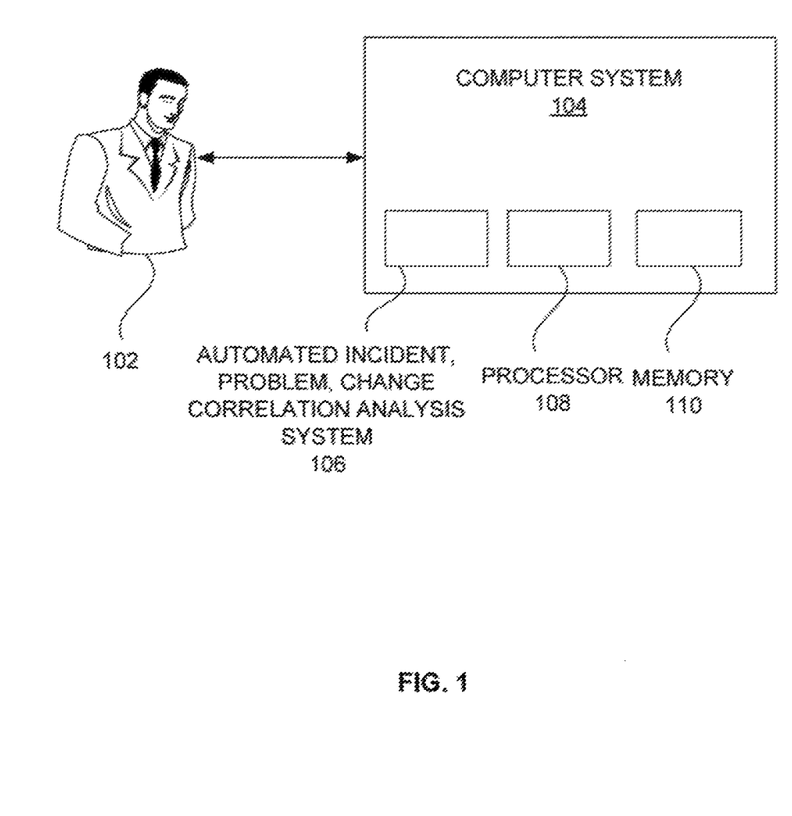
FIG. 1 is a system view illustrating a user interacting with an automated incident, problem, change correlation analysis system for determining correlation for an input incident, problem and change item according to an embodiment herein.

FIG. 1 is a system view illustrating a user 102 interacting with an automated incident, problem, and change correlation analysis system 106 using a computer system 104 for determining correlation for an input incident, problem and change item according to an embodiment herein. The computer system 104 further includes a memory 110 that stores instructions and a processor 108 configured by the instructions to execute the automated incident, problem, change correlation analysis system 106. In an embodiment, the computer system 104 may be a personal computer, a laptop, a tablet device, a smartphone, a mobile communication device, a personal digital assistant, or any other such computing device. The memory/storage 110 further includes a database that stores one or more persisted correlation maps. In an embodiment, the one or more persisted correlation maps include a historical map that correlates at least one of (a) essence key phrases of one or more incidents to essence key phrases of one or more problems, and (b) the essence key phrases of the one or more incidents to essence key phrases of one or more changes that cause the one or more incidents. The automated incident, problem, change correlation analysis system 106 automatically extracts at least one of (a) timestamps, (b) text fields that include at least one of (i) a title, and (ii) a description, (c) a category, or sub-category classification, (d) one or more related configuration items, (e) a group membership of a user who worked on, and (f) one or more outage records associated with the input incident, problem, and change items. In an embodiment, the automated incident, problem, change correlation analysis system 106 automatically extracts at least one of (a) one or more important keywords, and (b) one or more essence key phrases associated with the input incident, problem and change items.

The incident, problem, change correlation analysis system 106 automatically analyzes the one or more persisted correlation maps using the one or more essence key phrases associated with the input incident, problem, and change item to identify essence key phrases of contributing problems, and changes. In an embodiment, the incident, problem, change correlation analysis system 106 automatically clusters the input incidents, optionally with (a) problems, and (b) changes, to identify clusters of related incident, problem and change items based on at least one of (i) the time of occurrence, (ii) the one or more important keywords, (iii) the category, or the sub-category classification, (iv) the one or more related configuration items, (v) the group membership of the user who worked on, and (vi) the one or more outage records associated with the input incident, problem, and change items.

In another embodiment, the incident, problem, change correlation analysis system 106 automatically obtains user input to determine a final incident cluster. In another embodiment, the incident, problem, change correlation analysis system 106 automatically updates the plurality of persisted correlation maps with at least one of (a) a new/deleted incident-problem correlation, or (b) a new/deleted incident-change correlation.

Figure 2:
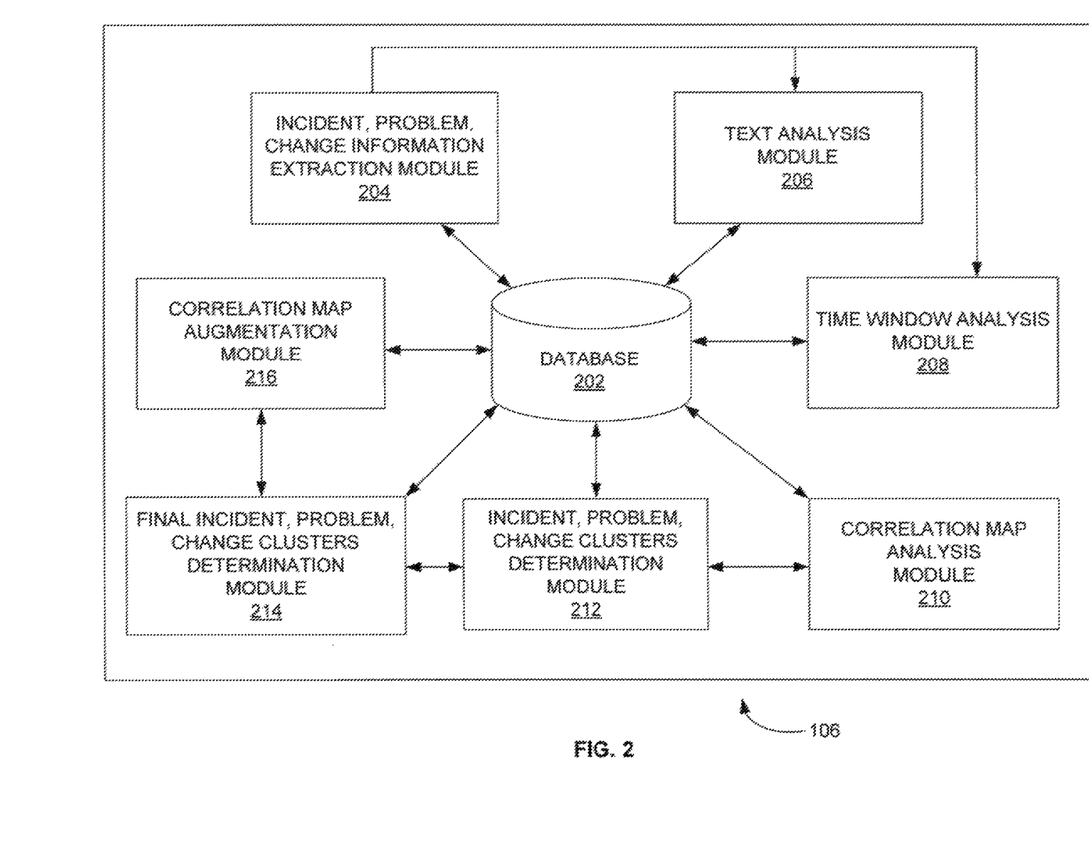
FIG. 2 illustrates an exploded view of the automated incident, problem, change correlation analysis system of FIG. 1 according to an embodiment herein.

FIG. 2 illustrates an exploded view of the automated incident, problem, change correlation analysis system of FIG. 1 according to an embodiment herein. The automated incident, problem, change correlation analysis system 106 includes a database 202, an incident, problem, change information extraction module 204, a text analysis module 206, a time window analysis module 208, a correlation map analysis module 210, an incident, problem, and change clusters determination module 212, a final incident, problem, change clusters determination module 214, and a correlation augmentation module 216. The database 202 stores one or more persisted correlation maps. The one or more persisted correlation maps include a historical map that correlates at least one of (a) essence key phrases of one or more incidents to essence key phrases of one or more problems, and (b) the essence key phrases of the one or more incidents to essence key phrases of the one or more changes that cause the one or more incidents.

The incident, problem, change information extraction module 204 automatically extracts at least one of (a) timestamps, (b) text fields that include at least one of (i) a title, and (ii) a description, (c) a category, or sub-category classification, (d) one or more related configuration items, (e) a group membership of a user who worked on, and (f) one or more outage records associated with the one or more input incident, problem, and change items. The text analysis module 206 automatically extracts at least one of (a) one or more important keywords, and (b) one or more essence key phrases from the text fields associated with the one or more incident, problem and change items. The time window analysis module 208 automatically identifies a time of occurrence of the one or more incident, problem and change items based on at least one of (a) the timestamps, and (b) a mention of time occurrence in the text fields associated with the one or more incident, problem and change items. The correlation map analysis module 210 automatically analyzes the one or more persisted correlation maps using the one or more essence key phrases associated with the one or more incidents to identify the essence key phrases of contributing problems, and changes.

The incident, problem, and change clusters determination module 212 automatically clusters the one or more incidents, optionally with (a) the one or more problems, and (b) the or more changes to identify clusters of related incident, problem and change items based on at least one of (i) the time of occurrence, (ii) the one or more important keywords, (iii) the category, or the sub-category classification, (iv) the one or more related configuration items, (v) the group membership of the user who worked on, and (vi) the one or more outage records associated with the one or more incident, problem, and change items. In an embodiment, the incident, problem, and change clusters determination module 212 automatically highlights (a) additions or removals of incidents, problems and changes when the one or more incident, problem and change items form a partially connected graph that needs to be completed, and (b) removals of the incidents, problems and changes and existence of sub-clusters as potential differences when the one or more incident, problem and change items from a connected graph that needs to be validated.

The final incident, problem, change clusters determination module 214 automatically obtains a user input to create a final incident cluster. In an embodiment, the incident, problem, and change clusters determination module 212 automatically determines matching problems and changes by (a) analyzing the one or more persisted correlation maps using the one or more essence key phrases of the one or more incidents, and (b) extending the final incident cluster to include problems and changes. In an embodiment, the incident, problem, and change clusters determination module 212 automatically ranks higher the problems and changes that match multiple incidents in the final incident cluster. The final incident, problem, change clusters determination module 214 automatically obtains a second user input to determine final incident, problem, and change clusters. The correlation map augmentation module 216 automatically updates the one or more persisted correlation maps with at least one of (a) the new/deleted incident-problem correlation, or (b) the new/deleted incident-change correlation based on the final incident, problem, and change clusters. In one embodiment, the incident, problem, and change clusters determination module 212 automatically determines the possible problems by analyzing one or more essence problem key phrases for the incident from the one or more persisted correlation maps if no matching problem record exists for the final incident cluster. The essence problem key phrases retrieved for multiple incidents may rank higher.

In an example embodiment, the automated incident, problem, change correlation analysis system 106 for automatically determining correlation for an input incident is provided. The incident, problem, change information extraction module 204 automatically extracts at least one of (a) timestamps, (b) text fields that include at least one of (i) a title, and (ii) a description, (c) a category, or the sub-category classification, (d) one or more related configuration items, (e) a group membership of the user who worked on, and (f) one or more outage records associated with an input incident. The text analysis module 206 automatically extracts at least one of (a) one or more important keywords, and (b) one or more essence key phrases from the text fields associated with the input incident. The one or more important keywords include one or more related keywords that are identified using semantic analysis. The time window analysis module 208 automatically identifies a time of occurrence of the input incident based on at least one of (a) the timestamps, and (b) a mention of the time occurrence in the text fields associated with the input incident.

The incident, problem, and change clusters determination module 212 automatically determines whether the input incident is related with at least one of (a) an existing incident cluster, and (b) an existing standalone incident by computing distances between the input incident and the existing incident cluster, or the existing standalone incident based on at least one of (i) the time of occurrence (ii) the one or more important keywords, (iii) the category, or the sub-category classification, (iv) the one or more related configuration items, (v) the group membership of the user who worked on, and (vi) the one or more outage records associated with the input incident. The incident, problem, and change clusters determination module 212 automatically clusters the input incident with (a) the existing standalone incident to form a new incident cluster if the input incident is related to the existing standalone incident, or (b) the existing incident cluster if the input incident is related to the existing incident cluster.

The correlation map analysis module 210 automatically analyzes the one or more persisted correlation maps using the one or more essence key phrases associated with the input incident to identify the essence key phrases of the matching problems, and changes. The incident, problem, and change clusters determination module 212 automatically (a) determines existing matching problems and changes using the one or more essence key phrases associated with the input incident if the input incident is a part of a new incident cluster, or a standalone incident, (b) adds new problem and change to the existing incident cluster if the input incident is a part of the existing incident cluster.

In an embodiment, the final incident, problem, change clusters determination module 214 automatically obtains user input for clustering the input incident to obtain the final incident, problem, and change cluster. The correlation map augmentation module 216 automatically updates the one or more persisted correlation maps with at least one of (a) a new incident-problem correlation, or (b) a new incident-change correlation.

In another embodiment, the incident, problem, and change clusters determination module 212 automatically determines the possible problems if no matching problem record exists for the new created incident cluster by analyzing essence key phrases retrieved from the persisted correlation maps for each incident of the new created incident cluster. The essence problem key phrases retrieved for multiple incidents may rank higher.

In another example embodiment, the automated incident, problem, change correlation analysis system 106 for automatically determining correlation for an input problem is provided. The incident, problem, change information extraction module 204 automatically extracts at least one of (a) timestamps, (b) text fields that includes at least one of (i) a title, and (ii) a description, (c) a category, or the sub-category classification, (d) one or more related configuration items, (e) a group membership of the user who worked on, and (f) one or more outage records associated with an input problem. The text analysis module 206 automatically extracts at least one of (a) one or more important keywords, and (b) one or more essence key phrases associated with the input problem. The one or more important keywords include one or more related keywords that are identified using semantic analysis. The time window analysis module 208 automatically identifies a time of occurrence of the input problem based on at least one of (a) the timestamps, and (b) a mention of the time occurrence in the text fields associated with the input problem. The incident, problem, and change clusters determination module 212 automatically determines potentially related incidents, and incident clusters based on a window identified by at least one of (a) padding the time of occurrence of the input problem, and (b) considering incident, problem and changes with same configuration items as the input problem.

The incident, problem, and change clusters determination module 212 further automatically re-clusters the existing incident cluster, or the standalone incident without associated problems based on at least one of (a) the one or more important keywords, (b) the category, or the sub-category classification, (c) the one or more related configuration items, or (d) the outage records, (e) the time of occurrence to determine whether (i) the input problem is related to the existing incident cluster, or the existing standalone incidents, or (ii) the input problem creates a new incident cluster, or associates with the standalone incident. The correlation map analysis module 210 automatically analyzes the one or more persisted correlation maps using the one or more essence key phrases associated with the input problem to identify whether the input problem is related with (a) an existing incident cluster, or (b) an existing standalone incident.

The final incident, problem, change clusters determination module 214 obtains a user input for clustering the input problem to obtain the final incident, problem change cluster. The correlation map augmentation module 216 automatically updates the one or more persisted correlation maps with at least one of (a) a new incident-problem correlation, or (b) a new incident-change correlation.

In one embodiment, the incident, problem, and change clusters determination module 212 may use a specialized algorithm, or one or more known applicable algorithms such as k-means, or a Density-based spatial clustering of applications with noise (DBSCAN) to cluster the incidents, optionally with (a) problems, and (b) changes.

Figure 3:
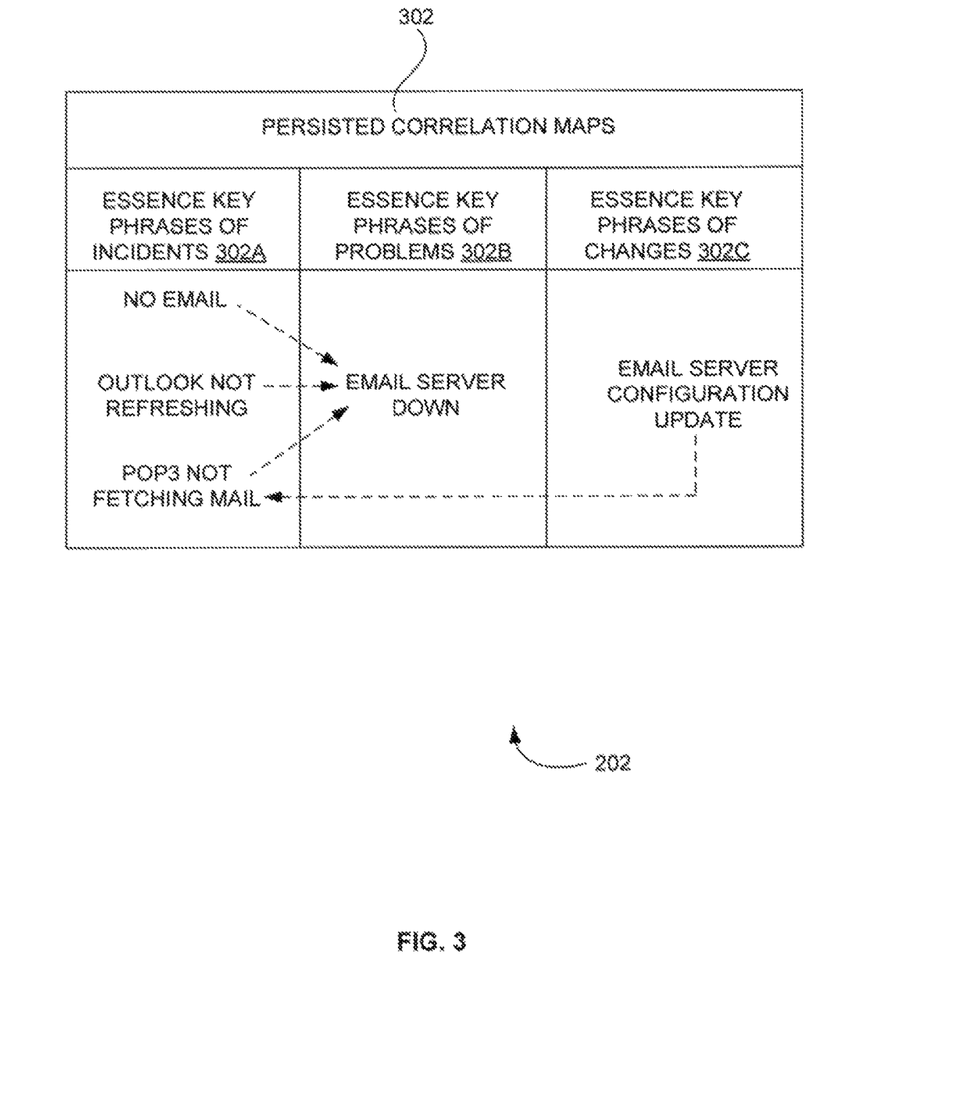
FIG. 3 illustrates a tabular view a database of FIG. 2 according to an embodiment herein.

FIG. 3 illustrates a tabular view a database 202 of FIG. 2 according to an embodiment herein. The tabular view of the database 202 includes a persisted correlation maps field 302. The persisted correlation maps field 302 includes an essence key phrases of incidents field 302A, an essence key phrases of problems field 302B, and an essence key phrases of changes field 302C. The essence key phrases of incidents field 302A includes one or more key phrases related to an incoming incident. The essence key phrases of problems field 302B includes one or more key phrases related to a problem. The essence key phrases of changes field 302C includes one or more key phrases related to a change that causes one or more incidents. For example, the incoming incident with the one or more essence key phrases such as 'No email', 'Outlook not refreshing', 'POP3 not fetching mail' are mapped to an underlying problem with an essence key phrase 'Email server down', and the problem may be caused by a change with an essence key phrase 'Email server configuration update'. For example, if the essence key phrase of the incoming incident is selected as 'No email', the persisted correlation maps provide the underlying problem as 'Email server down' and the problem may be caused by the change as 'Email server configuration update'.

Figure 4:
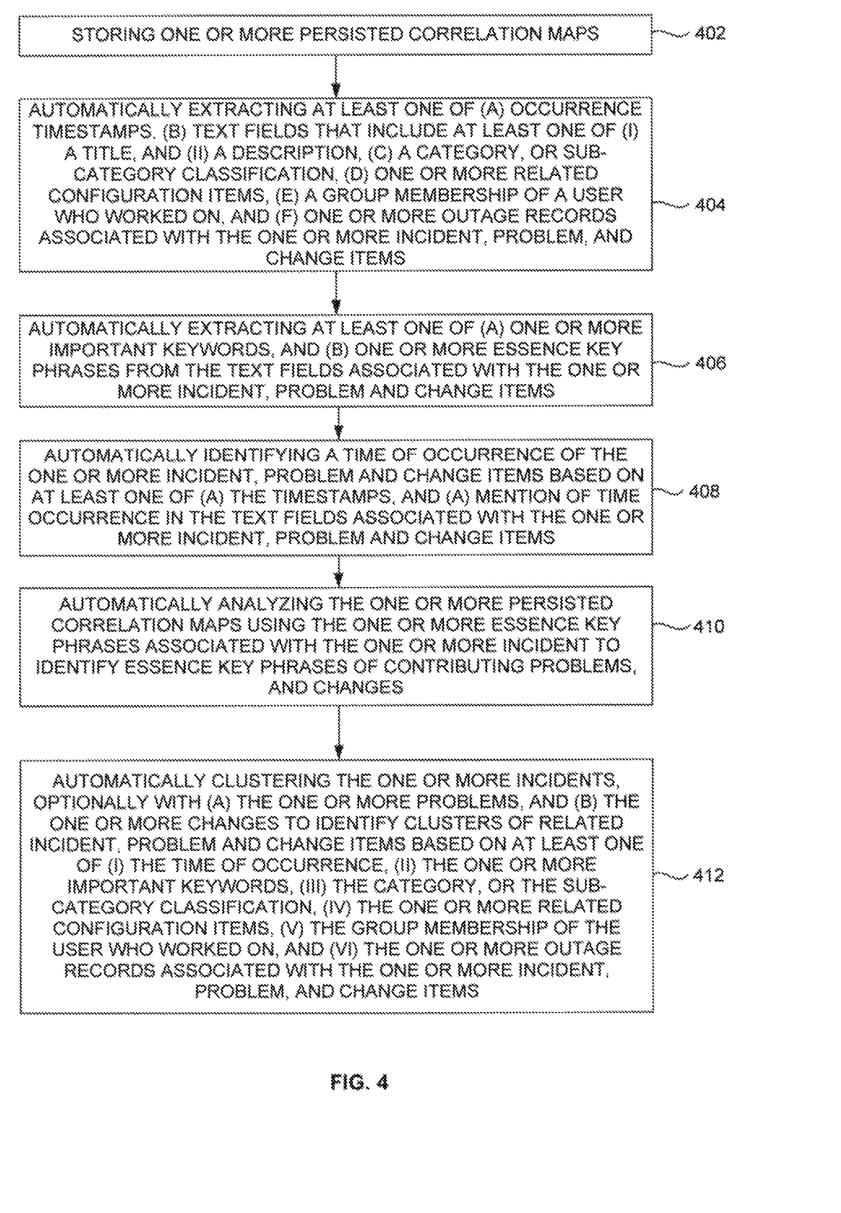
FIG. 4 is a flow diagram illustrating a method of automatically determining correlation for one or more incident, problem and change items according to an embodiment herein.

FIG. 4 is a flow diagram illustrating a method of automatically determining correlation for one or more incident, problem and change items according to an embodiment. At step 402, one or more persisted correlation maps are stored. The one or more persisted correlation maps include a historical map that correlates at least one of (a) essence key phrases of one or more incidents to essence key phrases of one or more problems, and (b) the essence key phrases of the one or more incidents to essence key phrases of one or more changes that cause the one or more incidents. At step 404, at least one of (a) occurrence timestamps, (b) text fields that include at least one of (i) a title, and (ii) a description, (c) a category, or sub-category classification, (d) one or more related configuration items, (e) a group membership of a user who worked on, and (f) one or more outage records associated with the one or more incident, problem, and change items are automatically extracted. At step 406, at least one of (a) one or more important keywords, and (b) one or more essence key phrases from the text fields associated with the one or more incident, problem and change items are automatically extracted. The one or more important keywords include one or more related keywords that are identified using semantic analysis. At step 408, a time of occurrence of the one or more incident, problem and change items are automatically identified based on at least one of (a) the timestamps, and (b) mention of time occurrence in the text fields associated with the one or more incident, problem and change items. At step 410, the one or more persisted correlation maps are automatically analyzed using the one or more essence key phrases associated with the one or more incident to identify essence key phrases of contributing problems, and changes. At step 412, the one or more incidents, optionally with (a) the one or more problems, and (b) the one or more changes to identify clusters of related incident, problem and change items are automatically clustered based on at least one of (i) the time of occurrence, (ii) the one or more important keywords, (iii) the category, or the sub-category classification, (iv) the one or more related configuration items, (v) the group membership of the user who worked on, and (vi) the one or more outage records associated with the one or more incident, problem, and change items.

In an embodiment, the method includes the step of automatically highlighting additions or removals of incidents, problems and changes when the one or more incident, problem and change items form a partially connected graph that needs to be completed. In another embodiment, the method includes the step of automatically highlighting removal of incidents, problems and changes and existence of sub-clusters as potential differences when the one or more incident, problem and change items from a connected graph that needs to be validated. In yet another embodiment, the method includes the step of automatically obtaining a first user input to create the final incident cluster. In yet another embodiment, the method includes the step of automatically determining matching problems and changes by (a) analyzing the one or more persisted correlation maps using the one or more essence key phrases of the one or more incidents, and (b) extending a final incident cluster to include problems and changes. In yet another embodiment, the method includes the step of automatically determining possible problems by analyzing one or more essence problem key phrases for each of the one or more incidents from the one or more persisted correlation maps if no matching problem record exists for the final incident cluster. The essence problem key phrases retrieved for multiple incidents may rank higher. In yet another embodiment, the method includes the step of automatically obtaining a second user input to determine final incident, problem, and change clusters. In another embodiment, the one or more persisted correlation maps are automatically updated with at least one of (a) a new/deleted incident-problem correlation, or (b) a new/deleted incident-change correlation based on the final incident, problem, and change clusters.

Figure 5A:
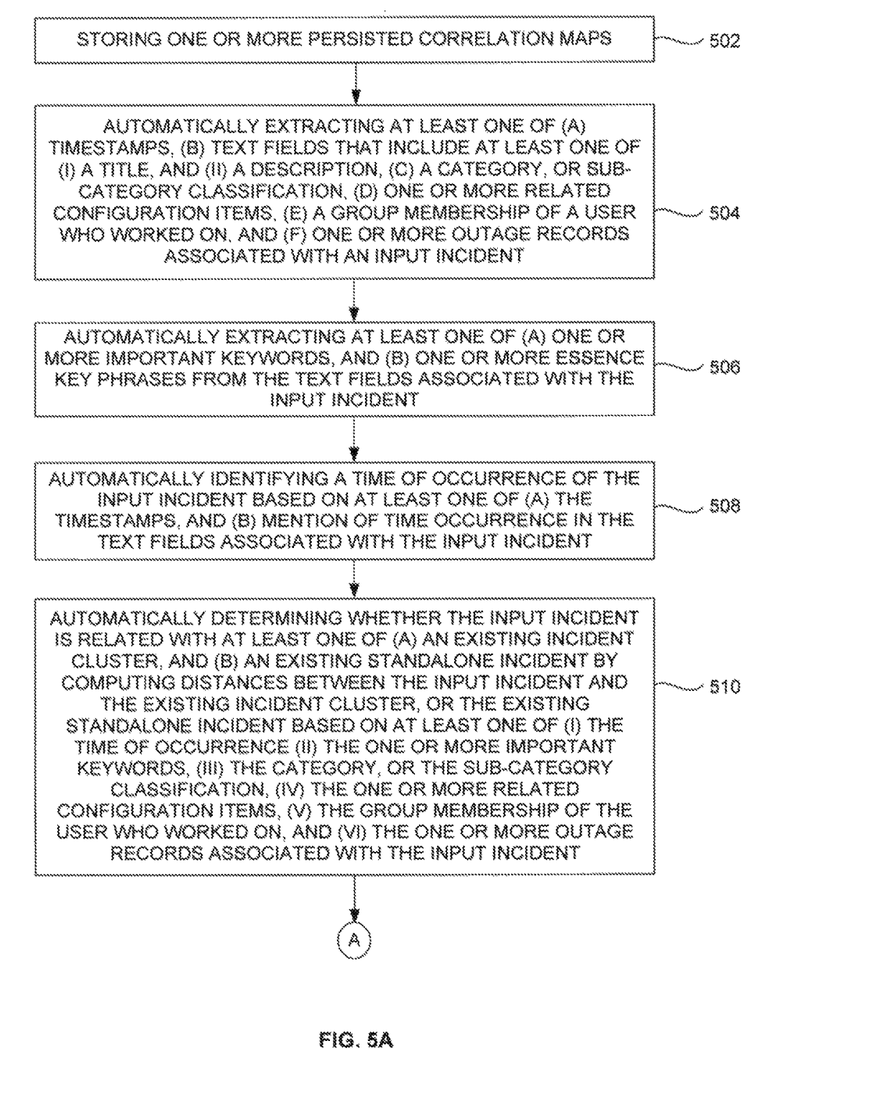
FIGS. 5A-5B are flow diagrams illustrating a method of automatically determining correlation for an input incident according to an embodiment herein.
Figure 5B:
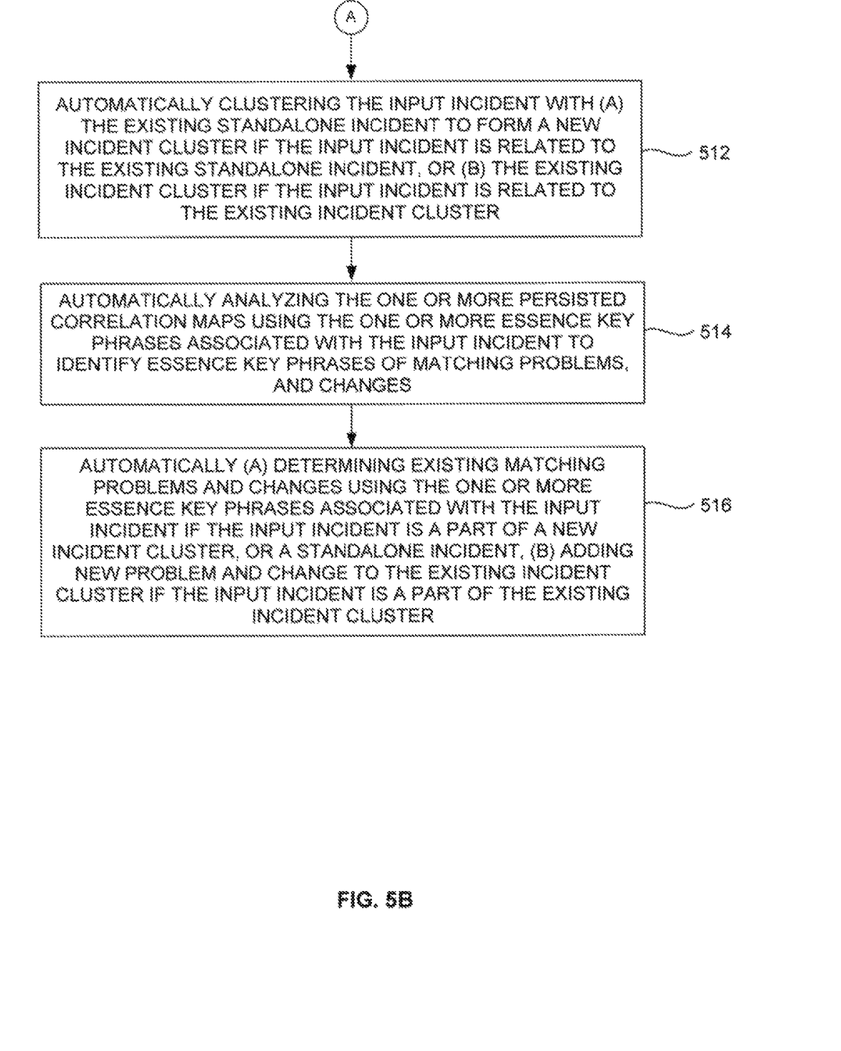

FIGS. 5A-5B are flow diagrams illustrating a method of automatically determining correlation for an input incident according to an embodiment herein. At step 502, one or more persisted correlation maps are stored. The one or more persisted correlation maps include a historical map that correlates at least one of (a) essence key phrases of one or more incidents to essence key phrases of one or more problems, and (b) the essence key phrases of the one or more incidents to essence key phrases of one or more changes that cause the one or more incidents. At step 504, at least one of (a) timestamps, (b) text fields that include at least one of (i) a title, and (ii) a description, (c) a category, or sub-category classification, (d) one or more related configuration items, (e) a group membership of a user who worked on, and (f) one or more outage records associated with the input incident is automatically extracted. At step 506, at least one of (a) one or more important keywords, and (b) one or more essence key phrases from the text fields associated with the input incident is automatically extracted. The one or more important keywords include one or more related keywords that are identified using semantic analysis. At step 508, a time of occurrence of the input incident is automatically identified based on at least one of (a) the timestamps, and (b) mention of time occurrence in the text fields associated with the input incident. At step 510, a distance between the input incident and an existing incident cluster, or an existing standalone incident is computed based on at least one of (i) the time of occurrence (ii) the one or more important keywords, (iii) the category, or the sub-category classification, (iv) the one or more related configuration items, (v) the group membership of the user who worked on, and (vi) the one or more outage records associated with the input incident to automatically determine whether the input incident is related with at least one of (a) the existing incident cluster, and (b) the existing standalone incident. At step 512, the input incident is automatically clustered with (a) the existing standalone incident to form a new incident cluster if the input incident is related to the existing standalone incident, or (b) the existing incident cluster if the input incident is related to the existing incident cluster. At step 514, the one or more correlation maps are automatically analyzed using the one or more essence key phrases associated with the input incident to identify essence key phrases of matching problems, and changes. At step 516, existing matching problems and changes are automatically determined using the one or more essence key phrases associated with the input incident if the input incident is a part of the new incident cluster, or a standalone incident, and new problem and change are added to the existing incident cluster if the input incident is a part of the existing incident cluster. In an embodiment, the method includes the steps of (i) automatically obtaining a user input for clustering the input incident to obtain a final incident, problem, and change cluster, and (ii) automatically updating the one or more persisted correlation maps with at least one of (a) a new incident-problem correlation, or (b) a new incident-change correlation. In another embodiment, the method includes the step of automatically determining possible problems if no matching problem record exists for the new created incident cluster by analyzing essence key phrases retrieved from the persisted correlation maps for each incident of the new created incident cluster. The essence problem key phrases retrieved for multiple incidents may rank higher.

Figure 6A:
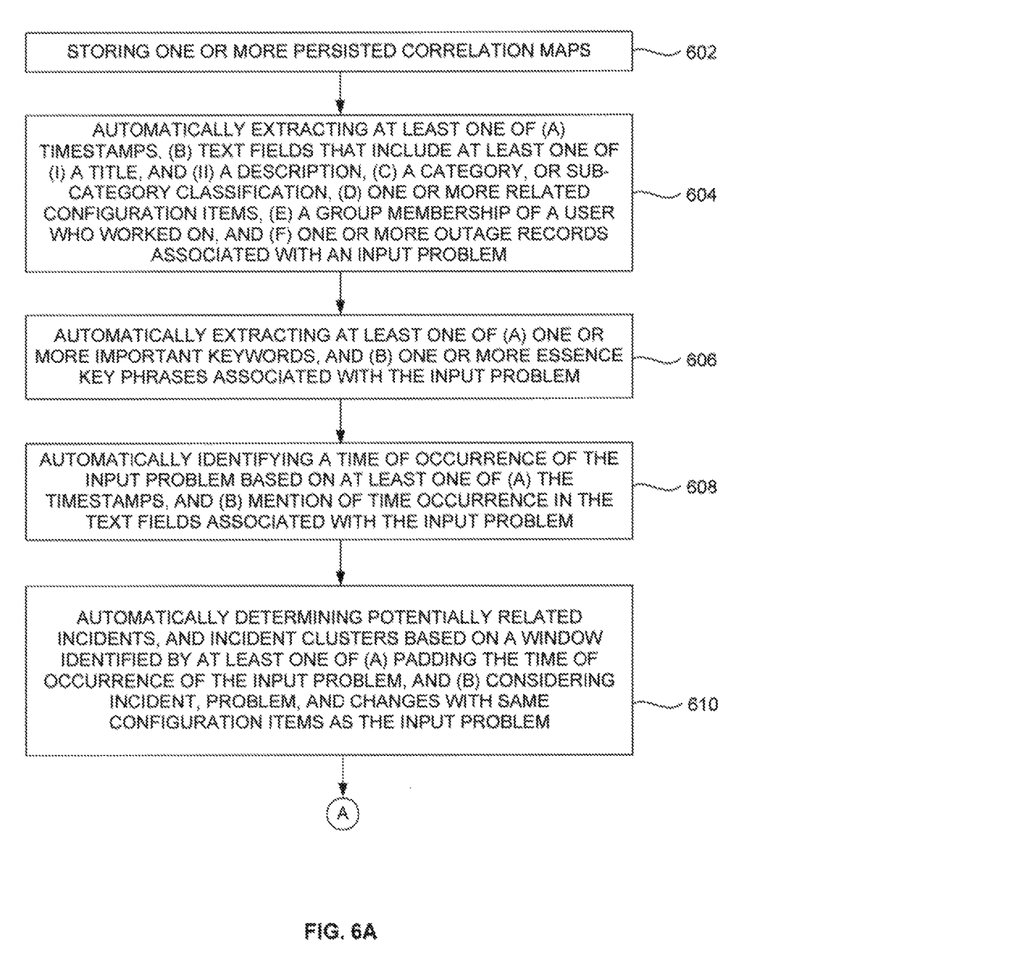
FIGS. 6A-6B are flow diagrams illustrating a method of automatically determining correlation for an input problem according to an embodiment herein.
Figure 6B:
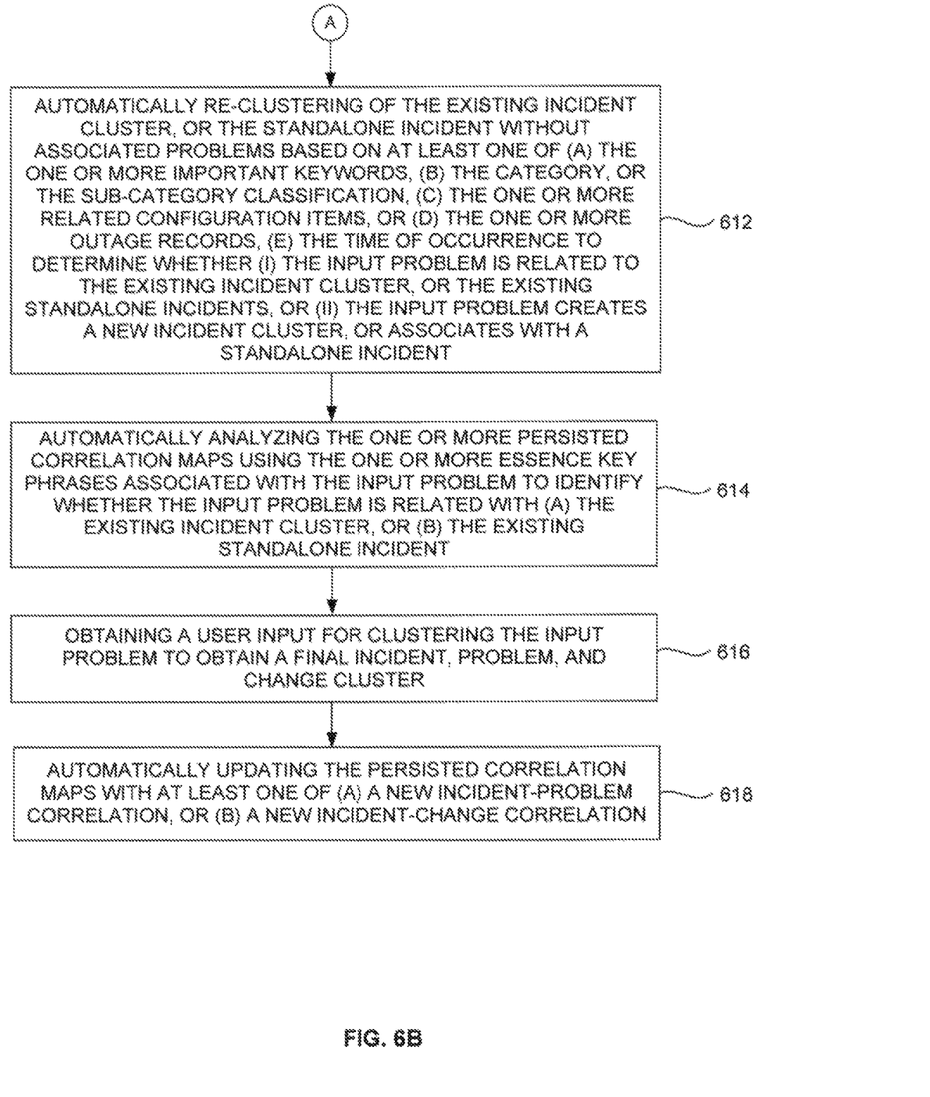

FIGS. 6A-6B are flow diagrams illustrating a method of automatically determining correlation for an input problem according to an embodiment herein. At step 602, one or more persisted correlation maps are stored in a database. The one or more persisted correlation maps include a historical map that correlates at least one of (a) essence key phrases of one or more incidents to essence key phrases of one or more problems, and (b) the essence key phrases of the one or more incidents to essence key phrases of one or more changes that cause the one or more incidents. At step 604, at least one of (a) timestamps, (b) text fields that includes at least one of (i) a title, and (ii) a description, (c) a category, or sub-category classification, (d) one or more related configuration items, (e) a group membership of a user who worked on, and (f) one or more outage records associated with the input problem is automatically extracted. At step 606, at least one of (a) one or more important keywords, and (b) one or more essence key phrases associated with the input problem is automatically extracted. The one or more important keywords include one or more related keywords that are identified using semantic analysis. At step 608, a time of occurrence of the input problem is automatically identified based on at least one of (a) the timestamps, and (b) mention of time occurrence in the text fields associated with the input problem. At step 610, potentially related incidents, and incident clusters are automatically determined based on a window identified by at least one of (a) padding the time of occurrence of the input problem, and (b) considering incident, problem and changes with same configuration items as the input problem. At step 612, the existing incident cluster, or the standalone incident without associated problems are automatically re-clustered based on at least one of (a) the one or more important keywords, (b) the category, or the sub-category classification, (c) the one or more related configuration items, or (d) the one or more outage records, (e) the time of occurrence to determine whether (i) the input problem is related to the existing incident cluster, or the existing standalone incidents, or (ii) the input problem creates a new incident cluster, or associates with a standalone incident. At step 614, the one or more persisted correlation maps are automatically analyzed using the one or more essence key phrases associated with the input problem to identify whether the input problem is related with (a) the existing incident cluster, or (b) the existing standalone incident. At step 616, a user input is obtained for clustering the input problem to obtain a final incident, problem change cluster. At step 618, the persisted correlation maps are automatically updated with at least one of (a) a new incident-problem correlation, or (b) a new incident-change correlation.

Figure 7:
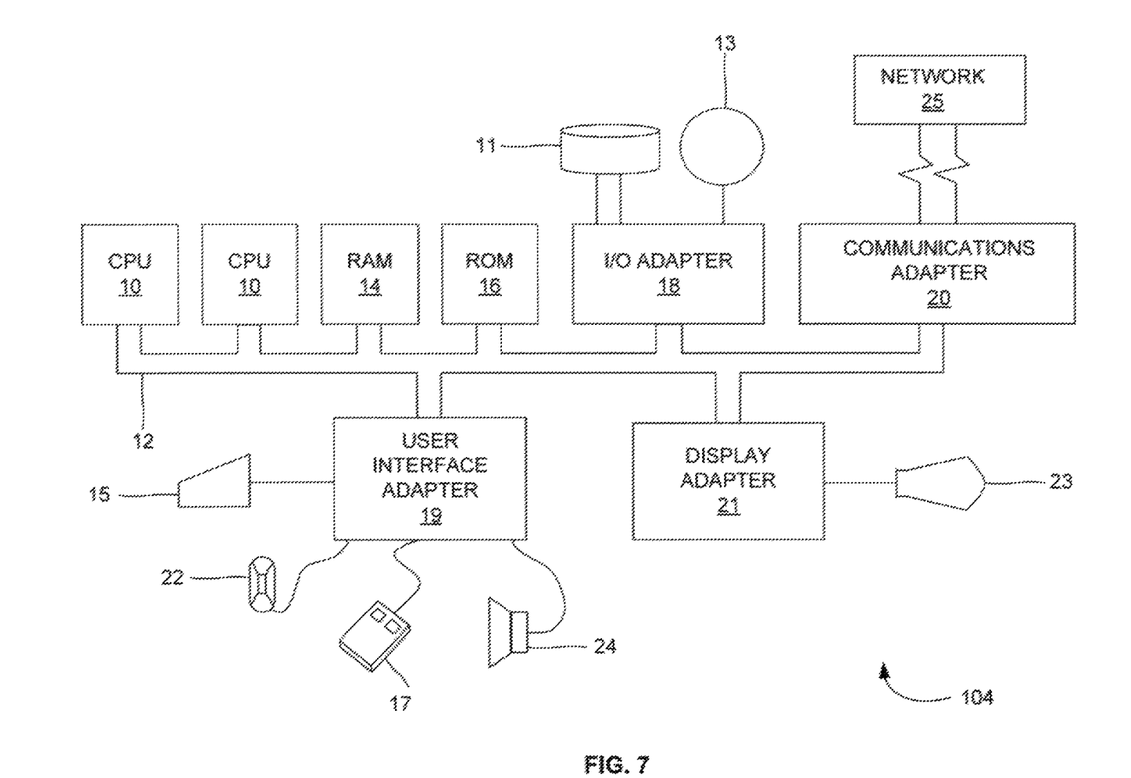
FIG. 7 is a computer system used in accordance with the embodiments herein.

FIG. 7, with reference to FIGS. 1 through 6B, is the computer system 104 of FIG. 1 used in accordance with the embodiments herein. The computer system 104 includes one or more of a personal computer, a laptop, a tablet device, a smartphone, a mobile communication device, a personal digital assistant, or any other such computing device, in one example embodiment, in another example embodiment. This schematic drawing illustrates a hardware configuration of an information handling/computer architecture in accordance with the embodiments herein. The computer system 104 includes one or more processor (e.g., the processor 108) or central processing unit (CPU) 10. The CPUs 10 are interconnected via system bus 12 to various devices such as a memory (RAM) 14, read-only memory (ROM) 16, and an input/output (I/O) adapter 18. Although, CPUs 10 are depicted, it is to be understood that the computer system 104 may be implemented with only one CPU.

The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communications adapter 20 connects the bus 12 to a data processing network 25, and a display adapter 21 connects the bus 12 to a display device 23 which may be embodied as an output device such as a monitor, printer, or transmitter, for example.

The automated incident, problem, change correlation analysis system 106 provides options for correlating incidents, problems and changes items in real time. The automated incident, problem, change correlation analysis system 106 automatically correlates incidents, problems and changes items in the real time that allows quick resolution of the incoming incidents when the incoming incidents are related to known problems and changes and/or related to other incidents which may be already worked on. The automated incident, problem, change correlation analysis system 106 not only categorizes new incidents, but also creates correlation maps for future analysis, validates existing correlations that are performed manually, and completes manually created correlation maps that may be partial. The automated incident, problem, change correlation analysis system 106 automatically correlates the incidents, problems, and changes items based on (a) automated analysis of content of incident, problem and change items, (b) automated analysis of any related configuration items and outage records, and (c) automated analysis of skill set of the a who worked on the incident, problem and changes items.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. One or more non-transitory computer readable storage mediums storing one or more sequences of instructions, which when executed by one or more processors, causes automatic determination of correlation for a plurality of incident, problem and change items, by performing the steps of:
   storing a plurality of persisted correlation maps, wherein said plurality of persisted correlation maps comprise a historical map that correlates (a) essence key phrases of a plurality of incidents to essence key phrases of a plurality of problems, and (b) said essence key phrases of said plurality of incidents to essence key phrases of a plurality of changes that cause said plurality of incidents;
   automatically extracting (a) occurrence timestamps, (b) text fields that comprise (i) a title, and (ii) a description, (c) a category, or sub-category classification, (d) a plurality of related configuration items, (e) a group membership of a user who worked on, and (f) a plurality of outage records associated with said plurality of incident, problem, and change items;
   automatically extracting (a) a plurality of important keywords, and (b) a plurality of essence key phrases from said text fields associated with said plurality of incident, problem and change items, wherein said plurality of important keywords comprise a plurality of related keywords that are identified using semantic analysis;
   automatically identifying a time of occurrence of said plurality of incident, problem and change items based on (a) said timestamps, and (b) mention of time of occurrence in said text fields associated with said plurality of incident, problem and change items;
   automatically analyzing said plurality of persisted correlation maps using said plurality of essence key phrases associated with said plurality of incidents to identify essence key phrases of contributing problems, and changes; and
   automatically clustering said plurality of incidents, optionally with (a) said plurality of problems, and (b) said plurality of changes to identify clusters of related incident, problem and change items based on (i) said time of occurrence, (ii) said plurality of important keywords, (iii) said category, or sub-category classification, (iv) said plurality of related configuration items, (v) said group membership of said user who worked on, and (vi) said plurality of outage records associated with said plurality of incident, problem, and change items, wherein correlating incidents to the plurality of problems, or to plurality of changes that may have led to the plurality of incidents categorizes and identifies a root cause of the plurality of incidents thereby facilitating resolution of the plurality of incidents quicker than if the incidents were not categorized and the root cause of the plurality of incidents was not identified, and identification of problematic incidents requiring urgent attention.

2. The one or more non-transitory computer readable storage mediums storing one or more sequences of instructions of claim 1, which when executed by one or more processors further causes automatic highlighting of additions or removals of incidents, problems and changes when said plurality of incident, problem and change items form a partially connected graph that needs to be completed.

3. The one or more non-transitory computer readable storage mediums storing one or more sequences of instructions of claim 1, which when executed by one or more processors further causes automatic highlighting of removal of incidents, problems and changes and existence of sub-clusters as potential differences when said plurality of incident, problem and change items from a connected graph that needs to be validated.

4. The one or more non-transitory computer readable storage mediums storing one or more sequences of instructions of claim 1, which when executed by one or more processors further causes automatically obtaining first user input to create a final incident cluster.

5. The one or more non-transitory computer readable storage mediums storing one or more sequences of instructions of claim 1, which when executed by one or more processors further causes automatic determination of matching problems and changes by (a) analyzing said plurality of persisted correlation maps using said plurality of essence key phrases of said plurality of incidents, and (b) extending said final incident cluster to include problems and changes.

6. The one or more non-transitory computer readable storage mediums storing one or more sequences of instructions of claim 5, which when executed by one or more processors further causes automatic ranking higher said problems and changes that match multiple incidents in said final incident cluster.

7. The one or more non-transitory computer readable storage mediums storing one or more sequences of instructions of claim 1, which when executed by one or more processors further causes (i) automatically obtaining a second user input to determine final incident, problem, and change clusters, and (ii) automatic updation of said plurality of persisted correlation maps with (a) a new/deleted incident-problem correlation, or (b) a new/deleted incident-change correlation based on said final incident, problem, and change clusters.

8. The one or more non-transitory computer readable storage mediums storing one or more sequences of instructions of claim 6, which when executed by one or more processors further causes automatic determination of possible problems by analyzing a plurality of essence problem key phrases for each of said plurality of incidents from said plurality of persisted correlation maps if no matching problem record exists for said final incident cluster, wherein essence problem key phrases retrieved for multiple incidents rank higher.

9. One or more non-transitory computer readable storage mediums storing one or more sequences of instructions, which when executed by one or more processors, causes automatic determination of correlation for an input incident, by performing the steps of:
   storing a plurality of persisted correlation maps, wherein said plurality of persisted correlation maps comprise a historical map that correlates (a) essence key phrases of a plurality of incidents to essence key phrases of a plurality of problems, and (b) said essence key phrases of said plurality of incidents to essence key phrases of a plurality of changes that cause said plurality of incidents;

automatically extracting (a) timestamps, (b) text fields that comprise (i) a title, and (ii) a description, (c) a category, or sub-category classification, (d) a plurality of related configuration items, (e) a group membership of a user who worked on, and (f) a plurality of outage records associated with said input incident;

automatically extracting (a) a plurality of important keywords, and (b) a plurality of essence key phrases from said text fields associated with said input incident, wherein said plurality of important keywords comprise a plurality of related keywords that are identified using semantic analysis;

automatically identifying a time of occurrence of said input incident based on (a) said timestamps, and (b) mention of time of occurrence in said text fields associated with said input incident;

automatically determining whether said input incident is related with (a) an existing incident cluster, and (b) an existing standalone incident by computing distances between said input incident and said existing incident cluster, or said existing standalone incident based on (i) said time of occurrence (ii) said plurality of important keywords, (iii) said category, or sub-category classification, (iv) the plurality of related configuration items, (v) said group membership of said user who worked on, and (vi) said plurality of outage records associated with said input incident;

automatically clustering said input incident with (a) said existing standalone incident to form a new incident cluster if said input incident is related to said existing standalone incident, or (b) said existing incident cluster if said input incident is related to said existing incident cluster;

automatically analyzing said plurality of persisted correlation maps using said plurality of essence key phrases associated with said input incident to identify essence key phrases of matching problems, and changes; and automatically (a) determining existing matching problems and changes using said plurality of essence key phrases associated with said input incident if said input incident is a part of a new incident cluster, or a standalone incident, (b) adding new problem and change to said existing incident cluster if said input incident is a part of said existing incident cluster, wherein correlating the input incident to the plurality of problems, or to plurality of changes that may have led to the incident in real time categorizes and identifies a root cause of the incident thereby facilitating resolution of the incident quicker than if the incident was not categorized and the root cause of the incident was not identified, and identification of if a problematic incident exists requiring urgent attention.

10. The one or more non-transitory computer readable storage mediums storing one or more sequences of instructions of claim 9, which when executed by one or more processors further causes (i) automatically obtaining user input for clustering said input incident to obtain a final incident, problem, and change cluster, and (ii) automatic updation of said plurality of persisted correlation maps with (a) a new incident-problem correlation, or (b) a new incident-change correlation.

11. The one or more non-transitory computer readable storage mediums storing one or more sequences of instructions of claim 9, further comprising the step of automatically determining possible problems if no matching problem record exists for said new created incident cluster by analyzing essence key phrases retrieved from said persisted correlation maps for each incident of said new created incident cluster, wherein essence problem key phrases retrieved for multiple incidents rank higher.

12. One or more non-transitory computer readable storage mediums storing one or more sequences of instructions, which when executed by one or more processors, causes automatic determination of correlation for an input problem, by performing the steps of:

storing a plurality of persisted correlation maps, wherein said plurality of persisted correlation maps comprise a historical map that correlates (a) essence key phrases of a plurality of incidents to essence key phrases of a plurality of problems, and (b) said essence key phrases of said plurality of incidents to essence key phrases of a plurality of changes that cause said plurality of incidents;

automatically extracting (a) timestamps, (b) text fields that comprise (i) a title, and (ii) a description, (c) a category, or sub-category classification, (d) a plurality of related configuration items, (e) a group membership of a user who worked on, and (f) a plurality of outage records associated with said input problem;

automatically extracting (a) a plurality of important keywords, and (b) a plurality of essence key phrases associated with said input problem, wherein said plurality of important keywords comprise a plurality of related keywords that are identified using semantic analysis;

automatically identifying a time of occurrence of said input problem based on (a) said timestamps, and (b) a mention of time of occurrence in said text fields associated with said input problem;

automatically determining potentially related incidents, and incident clusters based on a window identified by (a) padding said time of occurrence of said input problem, and (b) considering incident, problem and changes with same configuration items as said input problem;

automatic re-clustering of said existing incident cluster, or said standalone incident without associated problems based on (a) said plurality of important keywords, (b) said category, or sub-category classification, (c) said plurality of related configuration items, or (d) said plurality of outage records, (e) said time of occurrence to determine whether (i) said input problem is related to said existing incident cluster, or said existing standalone incidents, or (ii) said input problem creates a new incident cluster, or associates with said standalone incident;

automatically analyzing said plurality of persisted correlation maps using said plurality of essence key phrases associated with said input problem to identify whether said input problem is related with (a) said existing incident cluster, or (b) said existing standalone incident;

obtaining a user input for clustering said input problem to obtain a final incident, problem, and change cluster; and automatically updating said persisted correlation maps with (a) a new incident-problem correlation, or (b) a new incident-change correlation wherein correlating the input problem to existing incidents in real time categorizes and identifies a root cause of the plurality of incidents thereby facilitating resolution of the plurality of incidents quicker than if the incidents were not categorized and the root cause of the plurality of incidents was not identified, and identification of problematic incidents requiring urgent attention.

13. An automated incident, problem, change correlation analysis system that determines correlation for incident, problem and change items, said automated incident, problem, change correlation analysis system comprising:
 a memory that stores a database and a set of modules, wherein said database stores a plurality of persisted correlation maps, wherein said plurality of persisted correlation maps comprise a historical map that correlates (a) essence key phrases of a plurality of incidents to essence key phrases of a plurality of problems, and (b) said essence key phrases of said plurality of incidents to essence key phrases of a plurality of changes that cause said plurality of incidents;
 a display; and
 a processor that executes said set of modules, wherein said set of modules comprises:
  an incident, problem, change information extraction module, implemented by the processor, that automatically extracts (a) timestamps, (b) text fields that comprise (i) a title, and (ii) a description, (c) a category, or sub-category classification, (d) a plurality of related configuration items, (e) a group membership of a user who worked on, and (f) a plurality of outage records associated with said incident, problem, and change items;
  a text analysis module, implemented by the processor, that automatically extracts (a) a plurality of important keywords, and (b) a plurality of essence key phrases associated with said incident, problem and change items, wherein said plurality of important keywords comprise a plurality of related keywords that are identified using semantic analysis;
  a time window analysis module, implemented by the processor, that automatically identifies a time of occurrence of said incident, problem, and change items based on (a) said timestamps, and (b) mention of time of occurrence in said text fields associated with said incident, problem, and change items;
  a correlation map analysis module, implemented by the processor, that automatically analyzes said plurality of persisted correlation maps using said plurality of essence key phrases associated with said incident, problem, and change items to identify essence key phrases of contributing problems, and changes; and
 an incident, problem, change clusters determination module, implemented by the processor, that automatically clusters said incidents, optionally with (a) problems, and (b) changes to identify clusters of related incident, problem and change items based on (i) said time of occurrence, (ii) said plurality of important keywords, (iii) said category, or sub-category classification, (iv) said plurality of related configuration items, (v) said group membership of said user who worked on, and (vi) said plurality of outage records associated with said incident, problem, and change items,
 wherein correlating incidents to the plurality of problems, or to plurality of changes that may have led to the plurality of incidents categorizes and identifies a root cause of the plurality of incidents thereby facilitating resolution of the plurality of incidents quicker than if the incidents were not categorized and the root cause of the plurality of incidents was not identified, and identification of problematic incidents requiring urgent attention.

14. The automated incident, problem, change correlation analysis system of claim 13, further comprises a final incident, problem, and change clusters determination module, implemented by the processor, that automatically obtains user input to determine a final incident cluster.

15. The automated incident, problem, change correlation analysis system of claim 14, wherein said incident, problem, change clusters determination module automatically determines matching problems and changes by (a) analyzing said plurality of persisted correlation maps using said plurality of essence key phrases of said incident, and (b) extending said final incident cluster to include problems and changes.

16. The automated incident, problem, change correlation analysis system of claim 15, wherein said incident, problem, change clusters determination module automatically ranks higher said problems and changes that match multiple incidents in said final incident cluster.

17. The automated incident, problem, change correlation analysis system of claim 13, wherein said incident, problem, change clusters determination module performs (a) automatic highlighting of additions or removals of incidents, problems and changes when said plurality of incident, problem and change items form a partially connected graph that needs to be completed, and (b) automatic highlighting of removal of said incidents, problems and changes and existence of sub-clusters as potential differences when said plurality of incident, problem and change items from a connected graph that needs to be validated.

18. The automated incident, problem, change correlation analysis system of claim 14, wherein said final incident, problem, and change clusters determination module automatically obtains a second input to determine final incident, problem, and change clusters.

19. The automated incident, problem, change correlation analysis system of claim 13, further comprises a correlation map augmentation module, implemented by the processor, that automatically updates said plurality of persisted correlation maps with (a) a new/deleted incident-problem correlation, or (b) a new/deleted incident-change correlation.

20. The automated incident, problem, change correlation analysis system of claim 16, wherein said incident, problem, change clusters determination module automatically determines possible problems by analyzing a plurality of essence problem key phrases for said incident from said plurality of persisted correlation maps if no matching problem record exists for said final incident cluster, wherein essence problem key phrases retrieved for multiple incidents rank higher.

\* \* \* \* \*